(12) United States Patent
Suzuki et al.

(10) Patent No.: US 8,162,018 B2
(45) Date of Patent: Apr. 24, 2012

(54) PNEUMATIC TIRE

(75) Inventors: Nobuo Suzuki, Hiratsuka (JP); Satoru Isobe, Hiratsuka (JP); Kazuyuki Kabe, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 609 days.

(21) Appl. No.: 12/305,095

(22) PCT Filed: Jan. 26, 2007

(86) PCT No.: PCT/JP2007/051262
§ 371 (c)(1),
(2), (4) Date: Dec. 16, 2008

(87) PCT Pub. No.: WO2007/148447
PCT Pub. Date: Dec. 27, 2007

(65) Prior Publication Data
US 2009/0277557 A1 Nov. 12, 2009

(30) Foreign Application Priority Data
Jun. 23, 2006 (JP) .................... 2006-173658

(51) Int. Cl.
*B60C 9/18* (2006.01)
*B60C 9/20* (2006.01)
(52) U.S. Cl. .............. 152/531; 152/532; 152/537
(58) Field of Classification Search ............ 152/532, 152/531, 537
See application file for complete search history.

(56) References Cited

U.S. PATENT DOCUMENTS

| | | |
|---|---|---|
| 5,738,740 A | 4/1998 | Cluzel |
| 5,772,810 A | 6/1998 | Cluzel |
| 5,996,662 A * | 12/1999 | Cluzel ............... 152/531 |
| 6,615,889 B1 * | 9/2003 | Nakata ............... 152/526 |
| 7,500,501 B2 * | 3/2009 | Callamand et al. ...... 152/532 |
| 7,575,031 B2 * | 8/2009 | Manno et al. .......... 152/531 |
| 2005/0072508 A1 * | 4/2005 | Takagi .............. 152/559 |
| 2007/0113946 A1 * | 5/2007 | Manno et al. .......... 152/531 |

FOREIGN PATENT DOCUMENTS

| | | |
|---|---|---|
| JP | A 9-512226 | 12/1997 |
| JP | A 11-502166 | 2/1999 |
| JP | A 2000-177316 | 6/2000 |
| JP | A 2001-522748 | 11/2001 |
| JP | A 2004-276763 | 10/2004 |
| JP | A 2005-313837 | 11/2005 |
| JP | 2006199220 A * | 8/2006 |

OTHER PUBLICATIONS

Translation of Fukutani et al., JP 2000-177316 A, Jun. 2000.*

* cited by examiner

*Primary Examiner* — Joseph Del Sole
*Assistant Examiner* — Ryan Ochylski
(74) *Attorney, Agent, or Firm* — Greer, Burns & Crain, Ltd

(57) ABSTRACT

The present invention provides a pneumatic tire that inhibits any fatigue rupture at an edge portion of a circumferential-direction reinforcing belt layer and also inhibits any separation at an edge portion of crossed belt layers. In the pneumatic tire, at least two crossed belt layers are disposed on the outer circumferential side of a carcass layer in a tread portion. At least one circumferential-direction reinforcing belt layer with a width smaller than those of the crossed belt layers is disposed between the crossed belt layers. Moreover, a stress relaxation layer of a rubber composition having a fixed thickness is disposed between the crossed belt layers while lying adjacent to an edge portion of and outside, in the width directions of, the circumferential-direction reinforcing belt layer.

10 Claims, 2 Drawing Sheets

PNEUMATIC TIRE

This application is a U.S. National Phase under 35 U.S.C. §371 of International Application No. PCT/JP2007/051262, filed Jan. 26, 2007.

TECHNICAL FIELD

The present invention relates to a pneumatic tire suitable for a heavy-duty tire with an aspect ratio of 60% or less. Further specifically, the present invention relates to a pneumatic tire capable of inhibiting a fatigue rupture at an edge portion of a circumferential-direction reinforcing belt layer, and also inhibiting a separation at edge portions of crossed belt layers.

BACKGROUND ART

Recently, the aspect ratio of heavy-duty tires used for trucks and buses is now being reduced. Particularly, in many cases of tires with an aspect ratio of 60% or less, a circumferential-direction reinforcing belt layer having a cord angle of substantially 0° to a tire circumferential direction is disposed between crossed belt layers (see, for example, Patent Document 1). In such a belt structure, the cord tension at an edge portion of the circumferential-direction reinforcing belt layer is high. Accordingly, the cords at the edge portion of the circumferential-direction reinforcing belt layer are susceptible to a fatigue rupture. In order to avoid this problem, the widths of the crossed belt layers are made greater than the width of the circumferential-direction reinforcing belt layer, and these crossed belt layers are stacked so as to directly come into contact with each other at the outer sides, in a width direction, of the circumferential-direction reinforcing belt layer. Furthermore, an edge-portion buffering layer, so called belt edge cushion, is interposed between edge portions of the crossed belt layers. In this case, the crossed belt layers function on the outer sides, in the width directions, of the circumferential-direction reinforcing belt layer, thus reducing the cord tension in the edge portion of the circumferential-direction reinforcing belt layer. As a consequence, the fatigue rupture can be inhibited.

However, to prevent the growth of the outer-diameter of a shoulder portion of a pneumatic tire, a circumferential-direction reinforcing belt layer needs to be extended to the vicinity of the shoulder portion. Furthermore, in order to obtain the effect of inhibiting a fatigue rupture at an edge portion of a circumferential-direction reinforcing belt layer as described above, crossed belt layers need to be extended to the vicinity of a buttress portion. When the crossed belt layers are extended to the vicinity of the buttress portion, shear strain that acts on the crossed belt layers becomes large, and a separation between a cord and rubber is likely to occur at the edge portions of the crossed belt layers. Patent Document 1: Japanese patent application Tokuhyo No.

DISCLOSURE OF THE INVENTION

Problems to be Solved by the Invention

An object of the present invention is to provide a pneumatic tire capable of inhibiting a fatigue rupture at an edge portion of a circumferential-direction reinforcing belt layer, and also inhibiting a separation at edge portions of crossed belt layers.

Means for Solving the Problems

The pneumatic tire of the present invention that accomplishes the above object is characterized by including: at least two crossed belt layers disposed on an outer circumferential side of a carcass layer in a tread portion; at least one circumferential-direction reinforcing belt layer disposed between the crossed belt layers and having a width smaller than that of the crossed belt layer; and a stress relaxation layer disposed between the crossed belt layers while lying adjacent to an edge portion of and outside, in a width direction of, the circumferential-direction reinforcing belt layer, the stress relaxation layer being made of a rubber composition having a fixed thickness.

Effects of the Invention

In the present invention, it is possible to inhibit a fatigue rupture at an edge portion of the circumferential-direction reinforcing belt layer by sandwiching the circumferential-direction reinforcing belt layer between the crossed belt layers each of which has a greater width than that of the circumferential-direction reinforcing belt layer. Moreover, by providing the stress relaxation layer outside of the circumferential-direction reinforcing belt layer in the width directions, it is also possible to relax shear strain at edge portions of the crossed belt layers, and thus to inhibit a separation at that portion. Thus, it is possible to inhibit the separation at the edge portions of the crossed belt layers while inhibiting the fatigue rupture at the edge portion of the circumferential-direction reinforcing belt layer, by constructing the belt structure including the crossed belt layers, the circumferential-direction reinforcing belt layer and the stress relaxation layer as described above.

In the present invention, to effectively relax shear strain at an edge portion of the crossed belt layers, it is preferable that a rubber composition constituting the stress relaxation layer have a smaller modulus at 100% elongation than a modulus at 100% elongation of a rubber composition that covers cords of the crossed belt layers. Particularly, a modulus Ea at 100% elongation of the rubber composition constituting the stress relaxation layer and a modulus Eco at 100% elongation of the rubber composition that covers cords of the crossed belt layers preferably satisfy a relation of $0.6 \leq Ea/Eco \leq 0.9$. Furthermore, the modulus at 100% elongation of the rubber composition constituting the stress relaxation layer is preferably within a range from 4.0 MPa to 5.5 MPa. Note that, in the present invention, a modulus at 100% elongation is measured in accordance with the measurement method for tensile stress at a predetermined elongation, which is specified by JIS K6251.

The circumferential-direction reinforcing belt layer preferably has a cord angle of 0 to 5 degrees with respect to a tire circumferential direction, and has a width that is from 60% to 75% of a carcass section width. Each of the crossed belt layers preferably has a cord angle of 10 to 45 degrees with respect to the tire circumferential direction, and has a width greater than that of the circumferential-direction reinforcing belt layer by at least 10% of the carcass section width. By the combination of the circumferential-direction reinforcing belt layer and the crossed belt layers described above, the belt structure can exert its excellent performance.

In addition to the above-described stress relaxation layer, it is preferable to dispose an edge-portion buffering layer, made of the rubber composition, between the crossed belt layers and at a position corresponding to edge portions of the crossed belt layers. The stress relaxation layer is preferably disposed over an entire region between the circumferential-direction reinforcing belt layer and the edge-portion buffering layer. Meanwhile, an inter-cord rubber gauge t of a portion where the stress relaxation layer is interposed between the crossed belt layers preferably satisfies a relation of 0.8 D≦t≦1.7 D where D represents a cord diameter of the circumferential-direction reinforcing belt layer. Thereby, it is possible to effectively inhibit a separation at edge portions of the crossed belt layers.

It is preferable to dispose a high-angle belt layer between the carcass layer and the crossed belt layer. The high-angle belt layer preferably has a cord angle of 45 to 90 degrees with respect to the tire circumferential direction, and has a width that is from 60% to 85% of the carcass section width. Such a high-angle belt layer serves to prevent buckling of the tread portion by increasing bending rigidity of the belt structure.

It is preferable to dispose a protection belt layer on the outer circumferential side of the crossed belt layer. The protection belt layer preferably has a cord angle of 10 to 45 degrees with respect to the tire circumferential direction, and has a width that is from 60 to 85% of the carcass section width. Such a protection belt layer serves to protect the belt structure from damage.

In the present invention, the cord angle of each belt layer is measured at the equatorial position of the tire. Moreover, the carcass section width refers to the largest width of a carcass line at the meridian cross-section of the tire, the carcass line being formed under the condition where a pneumatic tire is installed on a normal rim and the tire is inflated to a normal inflation pressure. The normal rim refers to the "standard rim" specified by JATMA, the "Design Rim" specified by TRA, or the "Measuring Rim" specified by ETRTO. The normal inflation pressure refers to the "largest air pressure" specified by JATMA, the largest value described in "TIRE LOAD LIMITS AT VARIOUS COLD INFLATION PRESSURES" specified by TRA, or the "INFLATION PRESSURES" specified by ETRTO.

The present invention can be employed in various pneumatic tires. Preferably, the present invention is employed in a pneumatic tire with an aspect ratio of 60% or less. Particularly, when the present invention is employed in a pneumatic tire for heavy-duty, the effect is exhibited significantly.

DESCRIPTION OF REFERENCE NUMERALS

| | |
|---|---|
| 1 | tread portion |
| 2 | sidewall portion |
| 3 | bead portion |
| 4 | carcass layer |
| 5 | bead core |
| 7 | stress relaxation layer |
| 8 | edge-portion buffering layer |
| 61 | high-angle belt layer |
| 62, 64 | crossed belt layers |
| 63 | circumferential-direction reinforcing belt layer |
| 65 | protection belt layer |

BEST MODE FOR CARRYING OUT THE INVENTION

Hereinafter, a configuration of the present invention will be described in detail with reference to the accompanying drawings.

Figure 1:
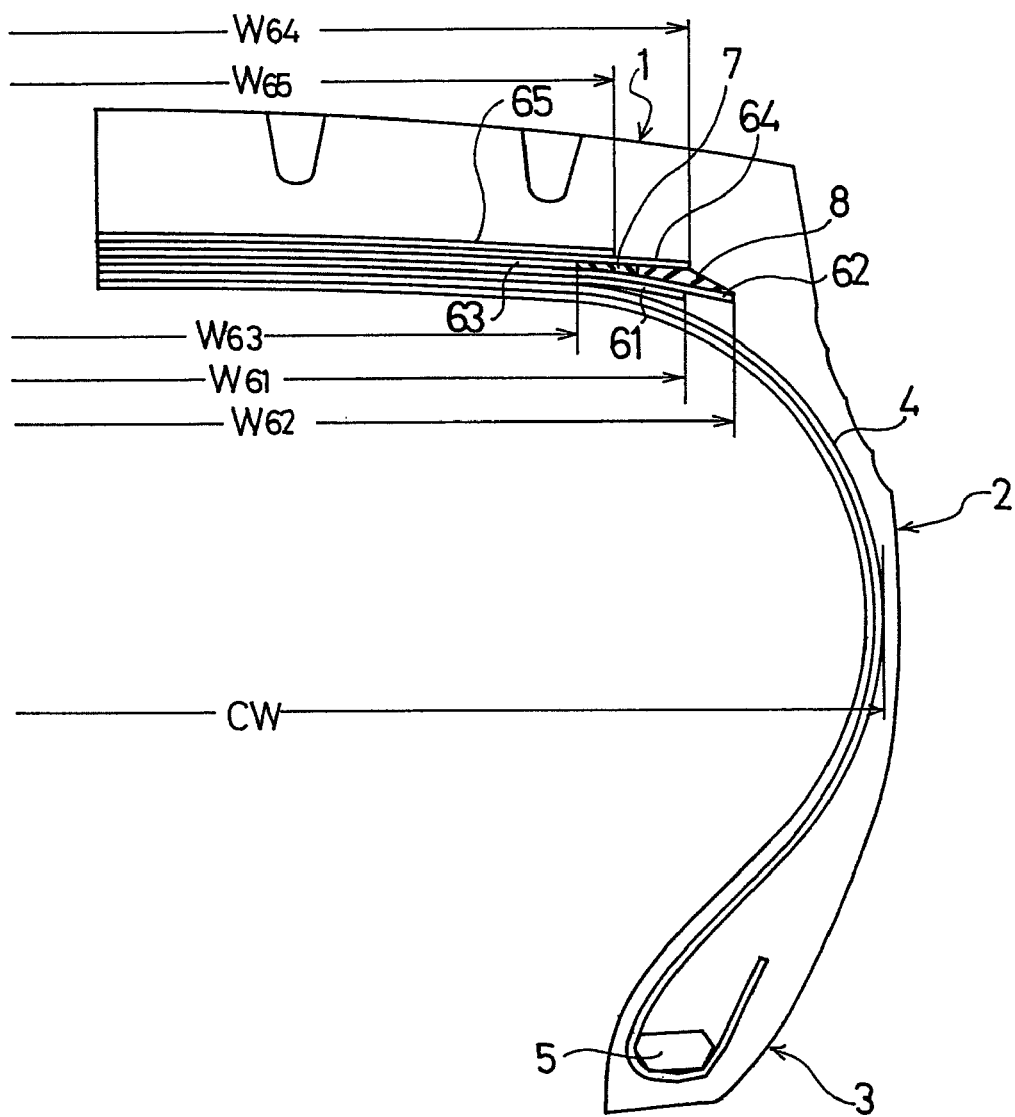
FIG. 1 is a meridian half cross-sectional view showing a pneumatic tire according to an embodiment of the present invention.
Figure 2:
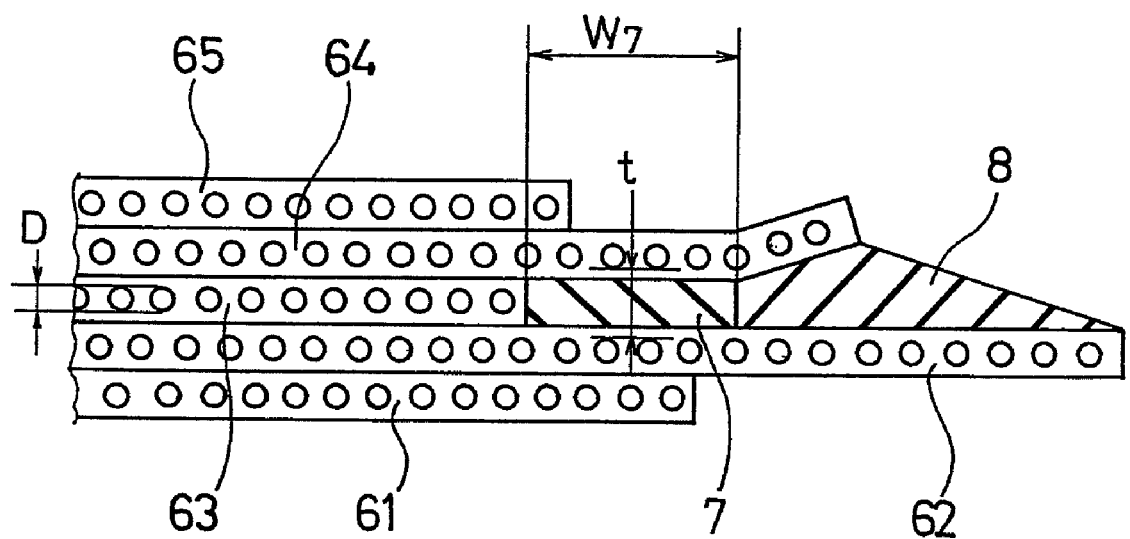
FIG. 2 is a cross-sectional view showing a belt structure extracted from the pneumatic tire of FIG. 1.

FIG. 1 shows a pneumatic tire for heavy-duty according to an embodiment of the present invention, and FIG. 2 shows a belt structure extracted therefrom. In FIG. 1, reference numeral 1 denotes a tread portion, reference numeral 2 denotes a sidewall portion, and reference numeral 3 denotes a bead portion. A carcass layer 4 is bridged between a left and right pair of the bead portions 3 and 3. Each end of the carcass layer 4 is folded back around a bead core 5 from the inner side of the tire to the outer side thereof. Belt layers 61 to 65 are disposed on the outer circumferential side of the carcass layer 4 in the tread portion 1 and over the entire circumference of the tire. Each of these belt layers 61 to 65 is formed of: multiple cords that are aligned in a uniform manner; and a rubber composition (belt coat compound) that covers the cords. As the belt cord, normally a steel cord is used. The belt layer 61 disposed closest to the carcass layer 4 is a high-angle belt layer (first belt layer). The belt layer 62 disposed on the outer circumferential side of the belt layer 61 is a crossed belt layer (second belt layer). The belt layer 63 disposed on the outer circumferential side of the belt layer 62 is a circumferential-direction reinforcing belt layer (third belt layer). The belt layer 64 disposed on the outer circumferential side of the belt layer 63 is a crossed belt layer (fourth belt layer). The belt layer 65 disposed on the outer circumferential side of the belt layer 64 is a protection belt layer (fifth belt layer) (see FIG. 2).

The circumferential-direction reinforcing belt layer 63 has a cord angle of 0 to 5 degrees with respect to the tire circumferential direction. The circumferential-direction reinforcing belt layer 63 has a width $W_{63}$ that is set within a range from 60% to 75% of a carcass section width CW. In the belt structure, the circumferential-direction reinforcing belt layer 63 mainly functions to support the tension in the tire circumferential direction. When the cord angle of the circumferential-direction reinforcing belt layer 63 exceeds the upper limit, the inflation-pressure maintaining performance is decreased. Meanwhile, when the width $W_{63}$ of the circumferential-direction reinforcing belt layer 63 is below the lower limit, the strain at an edge portion of the circumferential-direction reinforcing belt layer 63 is increased, and accordingly the circumferential-direction reinforcing belt layer 63 becomes susceptible to rupturing. On the other hand, the width $W_{63}$ exceeding the upper limit causes an increase in the tire mass.

Each of the crossed belt layers 62, 64 has a cord angle of 10 to 45 degrees with respect to the tire circumferential direction. The crossed belt layers 62, 64 respectively have widths $W_{62}$, $W_{64}$ each of which is set greater than the width of the circumferential-direction reinforcing belt layer 61 by at least 10% of the carcass section width CW. These crossed belt layers 62, 64 are disposed in a way that the cords of one of these layers cross those of the other one thereof. Thus, the cords of the crossed belt layer 62 restrict the movement of the cords of the crossed belt layer 64, and vice versa, thereby obtaining a high rigidity. When the cord angles of the crossed belt layers 62, 64 deviate from the above-mentioned range, the properties required for the belt structure cannot be exerted sufficiently. Meanwhile, when the widths $W_{62}$, $W_{64}$ of the crossed belt layers 62, 64 are far smaller than a prescribed value, the effect of inhibiting a fatigue rupture at an edge portion of the circumferential-direction reinforcing belt layer 63 is reduced.

The high-angle belt layer 61 has a cord angle of 45 to 90 degrees with respect to the tire circumferential direction. The high-angle belt layer 61 has a width $W_{61}$ that is set within a range from 60% to 85% of the carcass section width CW. The high-angle belt layer 61 functions to prevent buckling of the tread portion 1 by increasing the bending rigidity of the belt structure. When the cord angle of the high-angle belt layer 61 is below the lower limit, an improvement effect by the bending rigidity is reduced. Meanwhile, when the width $W_{61}$ of the high-angle belt layer 61 is below the lower limit, the improvement effect by the bending rigidity is reduced. On the other hand, the width $W_{61}$, exceeding the upper limit causes an increase in the tire mass.

The protection belt layer 65 has a cord angle of 10 to 45 degrees with respect to the tire circumferential direction. The protection belt layer 65 has a width $W_{65}$ that is set within a range from 60% to 85% of the carcass section width CW. The protection belt layer 65 functions to protect the belt structure from damage. When the cord angle of the protection belt layer 65 deviates from the above-mentioned range, the effect of protecting the belt structure is reduced. Meanwhile, when the width $W_{65}$ of the protection belt layer 65 is below the lower limit, the effect of protecting the belt structure is reduced. On the other hand, the width $W_{65}$ exceeding the upper limit causes an increase in the tire mass.

In the above-described pneumatic tire, a stress relaxation layer 7 is disposed between the crossed belt layers 62, 64 while lying adjacent to the edge portion of and outside, in the width direction of, the circumferential-direction reinforcing belt layer 63. The stress relaxation layer 7 is made of a rubber composition having a fixed thickness.

The rubber composition constituting the stress relaxation layer 7 has a smaller modulus at 100% elongation than the modulus at 100% elongation of the rubber composition that covers the cords of the crossed belt layers 62, 64. More specifically, a modulus Ea at 100% elongation of the rubber composition constituting the stress relaxation layer 7 and a modulus Eco at 100% elongation of the rubber composition that covers the cords of the crossed belt layers 62, 64 satisfy the relation of $0.6 \leqq Ea/Eco \leqq 0.9$. When Ea/Eco is less than 0.6, the rigidity owing to the crossed belt layers 62, 64 is decreased. On the other hand, when Ea/Eco exceeds 0.9, the stress relaxing effect is reduced. Due to the same reason, the modulus at 100% elongation of the rubber composition constituting the stress relaxation layer 7 is preferably set within a range from 4.0 to 5.5 MPa.

An inter-cord rubber gauge t of a portion where the stress relaxation layer 7 is interposed between the crossed belt layers 62, 64 and a cord diameter D of the circumferential-direction reinforcing belt layer 63 have the relation of $0.8\ D \leqq t \leqq 1.7\ D$. Thereby, it is possible to effectively inhibit separation of the crossed belt layers 62, 64 at their edge portions. When the inter-cord rubber gauge t is less than 0.8 D, the stress relaxing effect is reduced, and a separation at the edge portions of the crossed belt layers 62, 64 is likely to occur. On the other hand, when the inter-cord rubber gauge t exceeds 1.7 D, the rigidity owing to the crossed belt layers 62, 64 is reduced. In a case of a heavy-duty tire used for a truck or bus, the inter-cord rubber gauge t is preferably selected to be within a range of 1.7 to 2.5 mm. A width $W_7$ of the stress relaxation layer 7 having a fixed thickness is preferably set within a range from 3.5 to 7.0% of the carcass section width CW.

An edge-portion buffering layer 8 is disposed between the crossed belt layers 62, 64 and at a position corresponding to the edge portions of the crossed belt layers 62, 64. The edge-portion buffering layer 8 is made of the same rubber composition as that constituting the stress relaxation layer 7. The above-described stress relaxation layer 7 is disposed over the entire region between the circumferential-direction reinforcing belt layer 63 and the edge-portion buffering layer 8. In other words, the circumferential-direction reinforcing belt layer 63, the stress relaxation layer 7 and the edge-portion buffering layer 8 are disposed without clearance between the crossed belt layers 62, 64. This prevents the crossed belt layers 62, 64 from coming into contact with each other at any portion. In this manner, the stress relaxation layer 7 and the edge-portion buffering layer 8 relax the stress that occurs between the edge portions of the crossed belt layers 62, 64, thereby inhibiting a separation at the edge portions.

With the above-described pneumatic tire, it is possible to inhibit a fatigue rupture at the edge portion of the circumferential-direction reinforcing belt layer 63 by sandwiching the circumferential-direction reinforcing belt layer 63 between the crossed belt layers 62, 64 each of which has a greater width than that of the circumferential-direction reinforcing belt layer 63. Moreover, by providing the stress relaxation layer 7 outside, in the width direction of, the circumferential-direction reinforcing belt layer 63, it is possible to relax the shear strain at the edge portions of the crossed belt layers 62, 64, and thus to inhibit a separation at those portions. Particularly, when the present invention is employed in a pneumatic tire for heavy-duty with an aspect ratio of 60% or less, such effects are significant.

In the above-described embodiment, the description has been given as to the case where the two crossed belt layers and the one circumferential-direction reinforcing belt layer are provided. However, additional crossed belt layer and circumferential-direction reinforcing belt layer can be added thereto as necessary.

The preferred embodiment of the present invention has been described in detail so far. However, it is to be understood that various modifications, substitutions, and replacements can be made thereon without departing from the spirit and scope of the present invention defined by the scope of the attached claims.

EXAMPLES

Tires of Examples 1 and 2 were manufactured each of which was provided with a stress relaxation layer and an edge-portion buffering layer disposed between the crossed belt layers and outside, in width directions, of the circumferential-direction reinforcing belt layer. Each tire had a tire size of 435/45R22.5 164J, and a high-angle belt layer (first belt layer), a crossed belt layer (second belt layer), a circumferential-direction reinforcing belt layer (third belt layer), a crossed belt layer (fourth belt layer), and a protection belt layer (fifth belt layer) were disposed on the outer circumferential side of a carcass layer. For comparison, a conventional tire which had the same structure as those in Examples 1 and 2, except that a stress relaxation layer was not provided therein, was prepared. Note that, a modulus at 100% elongation of the rubber composition that covered the cords of all the belt layers was set to 6.3 MPa, and a modulus at 100% elongation of the rubber composition that constituted a stress relaxation layer was set to 4.8 MPa.

The load durability of each of these test tires was evaluated by the following test methods, and the results were shown in Table 1.

Load Durability:

Each of the test tires was mounted on a wheel having a rim size of 22.5×14.00, and an air pressure of the tire was set to 900 kPa. The tire and wheel were attached to a drum test machine to conduct a running test under conditions: at a speed of 45 km/h and a load of 68.65 kN. A running distance until the tire was ruptured was measured. The evaluation result was represented by an index with Conventional Example as 100. The larger index value means more excellent load durability.

TABLE 1

|  | Conventional Example | Example 1 | Example 2 |
|---|---|---|---|
| Carcass section width (mm) | 420 | 420 | 420 |
| First belt layer width (mm)/cord angle (°) | 310/60 | 310/60 | 310/60 |
| Second belt layer width (mm)/cord angle (°) | 365/20 | 365/20 | 365/20 |
| Third belt layer width (mm)/cord angle (°) | 275/0 | 275/0 | 275/0 |
| Fourth belt layer width (mm)/cord angle (°) | 345/20 | 345/20 | 345/20 |
| Fifth belt layer width (mm)/cord angle (°) | 305/20 | 305/20 | 305/20 |
| Presence or absence of stress relaxation layer | Absent | Present | Present |
| cord diameter (mm) of circumferential-direction reinforcing belt layer | 1.9 | 1.9 | 1.9 |
| Inter-cord rubber gauge (mm) of crossed belt layers | 1.0 | 2.2 | 3.0 |
| Load durability (index) | 100 | 125 | 113 |

As shown in Table 1, the tires of Examples 1 and 2 had significantly improved load durability in comparison with that of Conventional Example. In these tires of Examples 1 and 2, a fatigue rupture at the edge portion of the circumferential-direction reinforcing belt layer and a separation at the edge portions of the crossed belt layers were inhibited.

What is claimed is:

1. A pneumatic tire comprising:
    at least two crossed belt layers disposed on an outer circumferential side of a carcass layer in a tread portion;
    at least one circumferential-direction reinforcing belt layer disposed between the crossed belt layers and having a width smaller than those of the crossed belt layers;
    a stress relaxation layer disposed between the crossed belt layers while lying adjacent to an edge portion of and outside, in a width direction of, the circumferential-direction reinforcing belt layer, the stress relaxation layer being made of a rubber composition having a fixed thickness; and
    an edge-portion buffering layer, made of a rubber composition, disposed between the crossed belt layers and at a position corresponding to edge portions of the crossed belt layers,
    wherein the stress relaxation layer is disposed over an entire region between the circumferential-direction reinforcing belt layer and the edge-portion buffering layer.

2. The pneumatic tire according to claim 1, wherein the rubber composition constituting the stress relaxation layer has a smaller modulus at 100% elongation than a modulus at 100% elongation of a rubber composition that covers cords of the crossed belt layers.

3. The pneumatic tire according to claim 1, wherein a modulus Ea at 100% elongation of the rubber composition constituting the stress relaxation layer and a modulus Eco at 100% elongation of a rubber composition that covers cords of the crossed belt layers satisfy a relation of $0.6 \leq Ea/Eco \leq 0.9$.

4. The pneumatic tire according to any one of claims 1 to 3, wherein the modulus at 100% elongation of the rubber composition constituting the stress relaxation layer is within a range from 4.0 MPa to 5.5 MPa.

5. The pneumatic tire according to any one of claims 1 to 3, wherein:
    the circumferential-direction reinforcing belt layer has a cord angle of 0 degrees to 5 degrees with respect to the tire circumferential direction, and
    the circumferential-direction reinforcing belt layer has a width that is from 60% to 75% of a carcass section width.

6. The pneumatic tire according to claim 5, wherein:
    each of the crossed belt layers has a cord angle of 10 degrees to 45 degrees with respect to the tire circumferential direction, and
    the crossed belt layer has a width greater than that of the circumferential-direction reinforcing belt layer by at least 10% of the carcass section width.

7. The pneumatic tire according to any one of claims 1 to 3 wherein an inter-cord rubber gauge t of a portion where the stress relaxation layer is interposed between the crossed belt layers satisfies a relation of $0.8D \leq t \leq 1.7D$ where D represents a cord diameter of the circumferential-direction reinforcing belt layer.

8. The pneumatic tire according to any one of claims 1-3, further comprising:
    a high-angle belt layer disposed between the carcass layer and the crossed belt layers, the high-angle belt layer having a cord angle of 45 degrees to 90 degrees with respect to the tire circumferential direction and having a width of 60% to 85% of a carcass section width.

9. The pneumatic tire according to claim 8, further comprising:
    a protection belt layer disposed on the outer circumferential side of the crossed belt layers, the protection belt layer having a cord angle of 10 degrees to 45 degrees with respect to the tire circumferential direction, and having a width of 60% to 85% of the carcass section width.

10. The pneumatic tire according to any one of claims 1 to 3 wherein the pneumatic tire has an aspect ratio of 60% or less.

* * * * *